United States Patent
Lee et al.

(10) Patent No.: US 6,748,060 B2
(45) Date of Patent: Jun. 8, 2004

(54) APPARATUS AND METHOD FOR PROVIDING VOICE TELEPHONE INSTRUCTIONS

(75) Inventors: Peter Lee, Huntington Beach, CA (US); Kwok-Yeung Alexander Lai, Fountain Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 33 days.

(21) Appl. No.: 10/118,829

(22) Filed: Apr. 8, 2002

(65) Prior Publication Data

US 2003/0190022 A1 Oct. 9, 2003

(51) Int. Cl.⁷ .............................................. H04M 11/00
(52) U.S. Cl. ............................. 379/102.02; 379/102.03; 379/93.05
(58) Field of Search ....................... 379/102.02, 102.03, 379/93.09, 90.01, 93.01, 93.05, 93.06

(56) References Cited

U.S. PATENT DOCUMENTS

| | | |
|---|---|---|
| 3,467,788 A | 9/1969 | Why et al. |
| 3,864,532 A | 2/1975 | Van Der Plaats et al. |
| 4,157,459 A | 6/1979 | Bush et al. |
| 4,160,122 A | 7/1979 | Jacobson |
| 4,191,861 A | 3/1980 | Walker, Jr. |
| 4,232,195 A * | 11/1980 | Bartelink ............... 379/102.07 |
| 4,251,807 A | 2/1981 | Hofer et al. |
| 4,278,851 A | 7/1981 | Takaya |
| 4,409,588 A | 10/1983 | Hofer et al. |
| 4,413,253 A | 11/1983 | Hofer et al. |
| 4,417,100 A | 11/1983 | Carlson et al. |
| 4,453,043 A | 6/1984 | Zielinski et al. |
| 4,503,288 A | 3/1985 | Kessler |
| 4,511,764 A | 4/1985 | Nakayama et al. |
| 4,532,378 A | 7/1985 | Nakayama et al. |
| 4,574,272 A | 3/1986 | Brown |
| 4,602,245 A | 7/1986 | Yang et al. |
| 4,604,606 A | 8/1986 | Sweany |
| 4,655,621 A | 4/1987 | Holden |
| 4,728,933 A | 3/1988 | Mazza |
| 4,817,160 A | 3/1989 | De Koning et al. |
| 4,823,110 A | 4/1989 | Dorward et al. |
| 4,845,748 A | 7/1989 | Bohannon |
| 4,884,059 A | 11/1989 | Shapiro |
| 4,884,060 A | 11/1989 | Shapiro |
| 4,908,602 A | 3/1990 | Reich et al. |
| 4,926,459 A | 5/1990 | Advani et al. |
| 4,951,002 A | 8/1990 | Hanon |
| 5,091,930 A | 2/1992 | Shapiro |
| 5,128,979 A | 7/1992 | Reich et al. |
| 5,138,665 A | 8/1992 | Ito |
| 5,162,776 A | 11/1992 | Bushnell et al. |
| 5,218,634 A | 6/1993 | Lee |
| 5,287,398 A | 2/1994 | Briault |

(List continued on next page.)

FOREIGN PATENT DOCUMENTS

JP 408251270 A * 9/1996 ............ H04M/1/64

*Primary Examiner*—Melur Ramakrishnaiah
(74) *Attorney, Agent, or Firm*—Peter Hsieh

(57) ABSTRACT

A telephone handset that can be remotely activated. The audio data can be operating instructions of the handset and/or telephone numbers stored in the phone. The handset contains a line interface circuit that can detect a plurality of ring signals on a telephone line. The phone line is also coupled to a secondary phone device that has a line voltage detection circuit which detects a voltage drop within a predetermined time interval. The handset further contains a controller that can generate a tone signal to be transmitted onto the telephone line. The caller can then provide a responsive activation signal to activate the handset. The handset connects onto the telephone line for a time interval to detect the activation signal. The line connect time interval is less than the predetermined time interval of the line voltage detection circuit of the secondary phone device so that the line connect does not cause the secondary phone device to hang up the call.

25 Claims, 4 Drawing Sheets

U.S. PATENT DOCUMENTS

| | | |
|---|---|---|
| 5,432,837 A | 7/1995 | Engelke et al. |
| 5,457,730 A | 10/1995 | Rounds |
| 5,457,742 A | 10/1995 | Vallillee et al. |
| 5,548,632 A | 8/1996 | Walsh et al. |
| 5,608,797 A | 3/1997 | Larsen et al. |
| RE35,536 E | 6/1997 | Irissou et al. |
| 5,673,304 A | 9/1997 | Connor et al. |
| 5,710,806 A | 1/1998 | Lee et al. |
| 5,754,602 A | 5/1998 | Landry et al. |
| 5,850,439 A | 12/1998 | Yang |
| 5,926,769 A | 7/1999 | Valimaa et al. |
| 5,999,207 A * | 12/1999 | Rodriguez et al. ....... 348/14.01 |
| 6,047,048 A | 4/2000 | Lee et al. |
| 6,205,339 B1 | 3/2001 | Leung et al. |
| 6,480,586 B1 * | 11/2002 | Hayes et al. ........... 379/102.02 |

\* cited by examiner

APPARATUS AND METHOD FOR PROVIDING VOICE TELEPHONE INSTRUCTIONS

BACKGROUND OF THE INVENTION

1. Field of the Invention

The present invention relates to a telephone handset that provides audible information regarding the operation of the handset and a technique for remotely accessing a handset without interfering with an answering machine or voice mail.

2. Background Information

Telephone handsets are typically sold with an operating manual. The manual describes how to operate various functions and features of the phone. For example, the manual may describe how to store phone numbers into memory of the handset. The manual is sometimes lost or otherwise not available to the user. This may lead to user frustration and non-use of certain functions of the phone. It would be desirable to provide a handset that allows the user to access operating instructions of the phone. It would also be desirable to access the operating instructions from a remote location.

Acquiring operating instructions or otherwise accessing a phone from a remote location requires dialing into the telephone handset. If the handset is connected to an answering machine or voice-mail, these devices may interfere with the accessing of the phone. For example, the answering machine or voice-mail may activate after a set number of rings before the user can access the phone. Increasing the ring count of the answering machine and/or voice mail may cause the operating instruction retrieval function to always be activated. Consequently, either the answering machine/voice mail or handset remote access programs will be cut-off regardless of the ring count of the devices. It is therefore desirable to provide a method for allowing remote access to a phone without conflicting with voice-mail or an answering machine.

BRIEF SUMMARY OF THE INVENTION

A telephone handset that can be remotely activated. The handset contains a line interface circuit that can detect a plurality of ring signals on a telephone line. The phone line is also coupled to a secondary phone device that has a line voltage detection circuit which detects a voltage drop within a predetermined time interval. The handset contains a controller that can generate a tone signal to be transmitted onto the telephone line. The caller can provide an activation signal in response to the tone signal to activate the handset. The handset connects onto the telephone line for a time interval to detect the activation signal. The line connect time interval is less than the predetermined time interval of the line voltage detection circuit.

DETAILED DESCRIPTION

Figure 1:
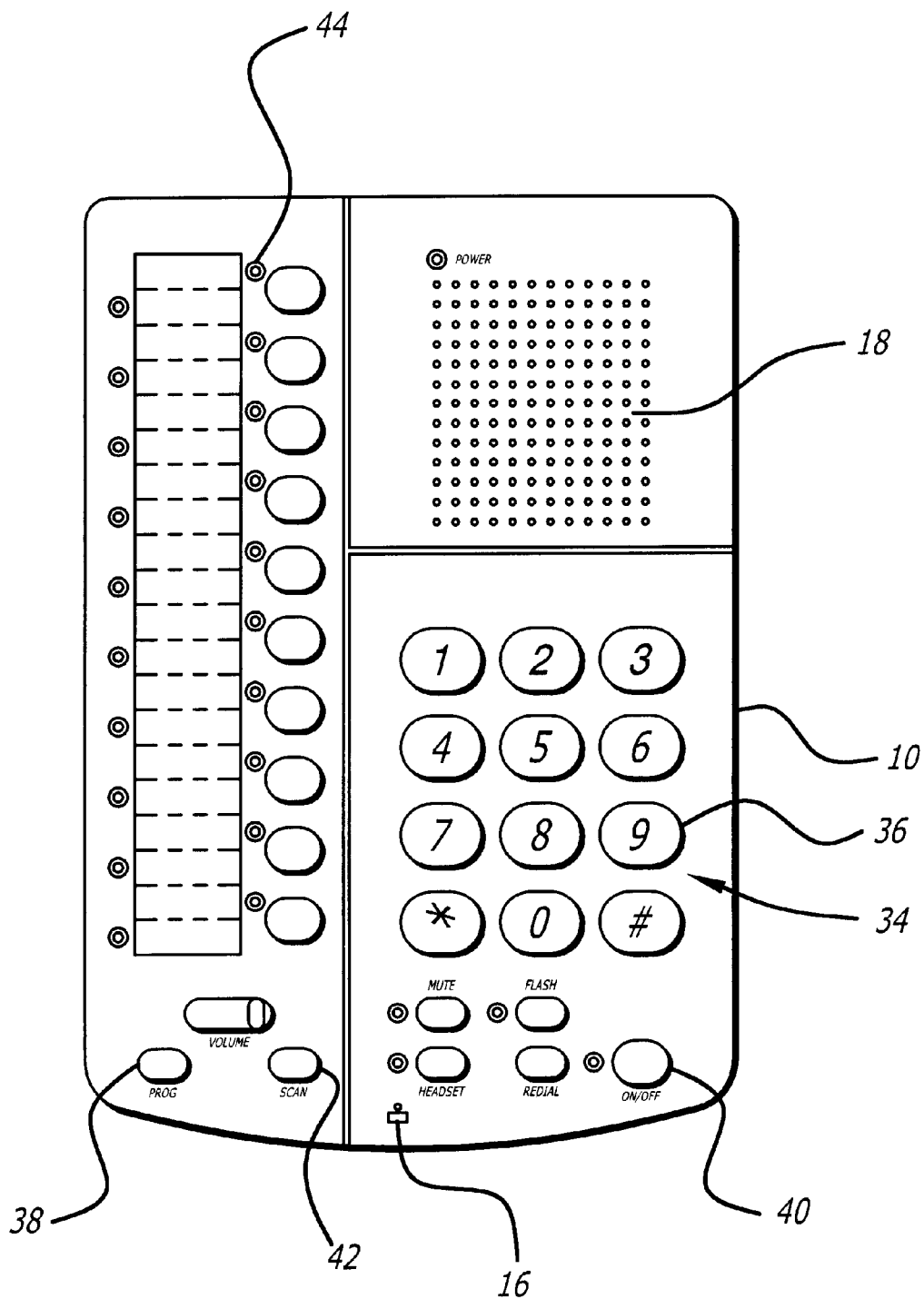
FIG. 1 is a top view of a telephone handset.
Figure 2:
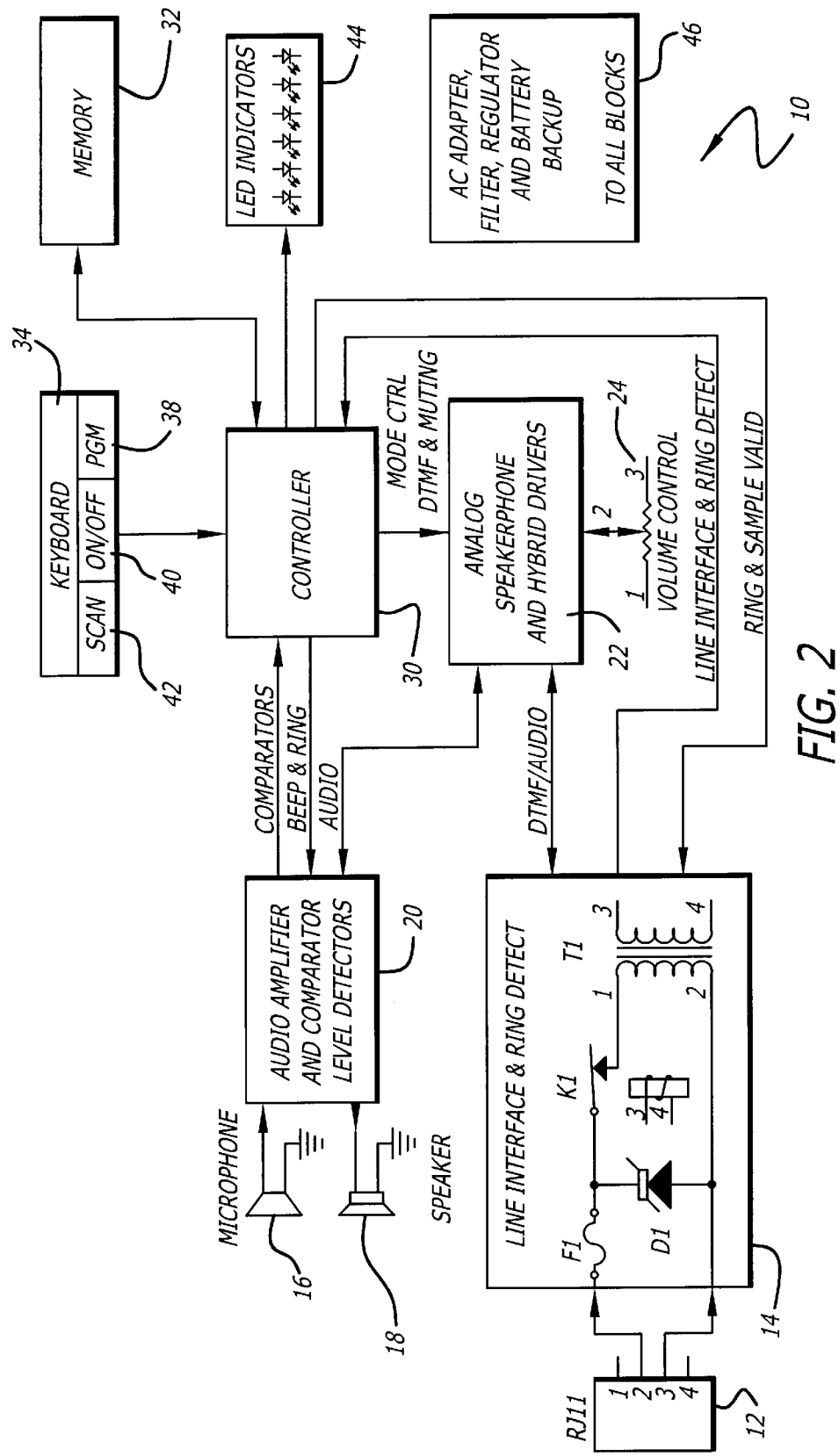
FIG. 2 is a schematic of the telephone handset.

Referring to the drawings more particularly by reference numbers, FIGS. 1 and 2 show a telephone handset 10. The handset 10 can be coupled to a public switched telephone network (PSTN) through an RJ11 jack 12. A line detection circuit 14 is coupled to the RJ11 jack 12. The line detection circuit 14 can detect a ring voltage, and switch between an on hook state and an off hook state.

The handset 10 may include a microphone 16 and a speaker 18 that are connected to an audio interface circuit 20. The audio interface circuit 20 contains comparators, filters, level detectors and other circuitry required to operate the microphone 16. The audio interface circuit 20 and line detection circuit 14 are coupled to a driver circuit 22. The driver circuit 22 can be connected to a volume control input 24.

The handset 10 includes a controller 30 that is coupled to the line detection circuit 14, the audio interface circuit 20 and the driver circuit 22. The controller 30 is also connected to a memory circuit 32. The memory circuit 32 is adapted to store data and instructions. The instructions can be used by the controller 30 to perform software routines. The data may include operating instructions on how to use the various functions and features of the handset 10. Additionally, the data may include telephone numbers. The controller 30 can cause the data stored in memory 32 to be emitted from the speaker 18 through the interface circuit 20. For example, the controller 30 can cause the audio emission of instructions for operating the handset, or telephone numbers stored in memory. This approach is to be distinguished from conventional voice mail and data retrieval systems, where the instructions are stored in a remote server. Accessing server based data retrieval systems can be difficult if there is a problem with the server or the communication with the server. Storing the instructions and data in the telephone handset 10 eliminates a reliance on a remote server to access the handset.

The controller 30 can also cause the transmission of data through the driver circuit 22 and line detection circuit 14 onto a telephone line (not shown) connected to the RJ11 jack 12. The controller 30 enables a user to retrieve the data stored in the memory circuit 32 by dialing into the handset 10 over the telephone line. The controller 30 may operate a routine that automatically enters into a data retrieval mode if the line detection circuit 14 detects a predetermined number of ring signals.

Alternatively, or in addition to, the controller 30 may enter a monitoring mode wherein the microphone 16 and speaker 18 are activated. In the monitoring mode a remote caller can monitor the occupant of the room. The controller 30 may generate audio instructions through the telephone line that request a password that can be entered through the handset used by the remote caller. The controller 30 may further generate audio queries to the remote caller requesting whether the caller wants to stay on the line. This query may occur at predetermined time intervals. In addition to activating the microphone 16 and speaker 18 other functions such as medical diagnostic information and video teleconferencing can be performed through the handset 10. The data retrieval and monitoring modes will be referred to as activating the handset.

A secondary phone device such as voice mail or an answering machine (not shown) may be coupled to the handset 10. Answering machines contain line voltage detection circuits that can detect a voltage drop in the phone line to determine when the caller has terminated the call. The answering machine and data retrieval/monitoring modes of the handset 10 would normally be in conflict with each other.

When remotely activating the handset 10 the answering machine may be activated because of the ring signals generated by dialing the phone 10. If the answering machine ring count is shorter than the ring count for handset activation then the answering machine will pick-up before the handset is activated. The user is thus never able to retrieve data or monitor an occupant because the answering machine always turns on before handset activation. Shortening the ring count for handset activation will cause the handset to enter the retrieval or monitoring modes before activation of the answering machine. A caller trying to leave a message will thus enter the data retrieval or monitoring modes and not the answering machine.

To avoid interference with the answering machine, the controller 30 may utilize a special protocol to enable activation of the handset without activating the answering machine. The protocol may include transmitting to the end user one or more tone signals. Upon hearing the tone signals, the user may transmit an activation signal that is received by the handset and causes the controller 30 to enter the data retrieval or monitor modes. The handset connects to the telephone line for a short time interval to detect the activation signal. The time interval is less than a predetermined time interval used by the line voltage detection circuit of the answering machine to detect an off-hook condition of the line. Connecting to the phone line to detect the activation signal causes a voltage drop in the phone line. If the time interval for detecting the activation signal were longer than the time interval of the answering machine detection circuit, the answering machine would detect the voltage drop and hang-up the call. If the caller does not provide an activation signal, the ring signals continue until the answering machine is activated.

By way of example, the pre-determined time interval of the line-voltage detection circuit in an answering machine is approximately 500 milliseconds. This is the clock speed of the detection circuit. The time interval for detecting the activation signal is preferably 300 milliseconds. Additionally, the tone signals sent to the remote caller may also be less than the time interval of the answering machine time interval of 500 milliseconds. For example, the handset may generate two single frequency tones of 1800 and 2400 hertz. The total time duration of the two tone signals may be approximately 300 milliseconds. Because the time duration of the tone signals is less than the time interval of the answering machine delay detection circuit these signals also do not interfere with the answering machine count.

The remote caller can generate the activation signal to trip the controller into the data retrieval/monitor mode by depressing a handset key for 2–3 seconds. After generating the tone signals, the controller 30 listens for a DTMF signal (activation signal) in a time interval that is again less than the time interval of the answering machine detection circuit. If no DTMF signal is detected the controller 30 enters an idle mode.

The handset 10 may have a keyboard 34 which has a number of individual keypads 36 including 0–9, * and #. The keyboard 34 may further have a program PRGM keypad 38 which allows a user to store phone numbers. By way of example, when the PRGM keypad 38 is depressed the controller 30 enters a mode so that all subsequent entries into the keypads 36 are stored in memory.

The keyboard 34 may further have an on/off switch 40, and a SCAN keypad 42 that when activated scans the various telephone numbers. The handset 10 may have a plurality of light emitting diodes (LEDs) 44 that are associated with each telephone number stored in the memory circuit 32. The telephone handset 10 may further include an AC adapter, filter, regulators and battery backup 46 required to operate the handset 10.

Figure 3A:
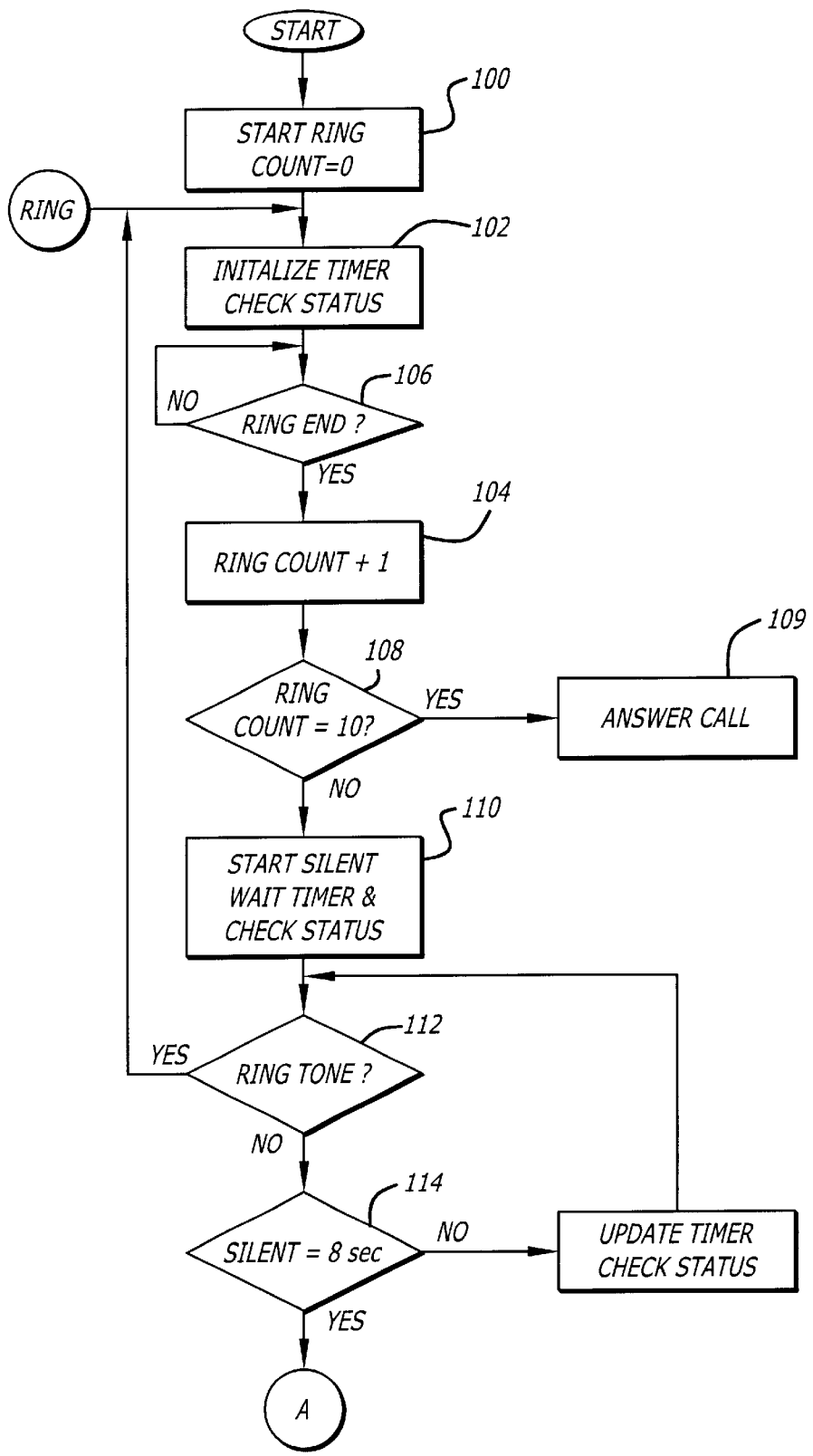
FIGS. 3a and 3b are flowcharts showing activation of the handset from a remote caller unit.
Figure 3B:
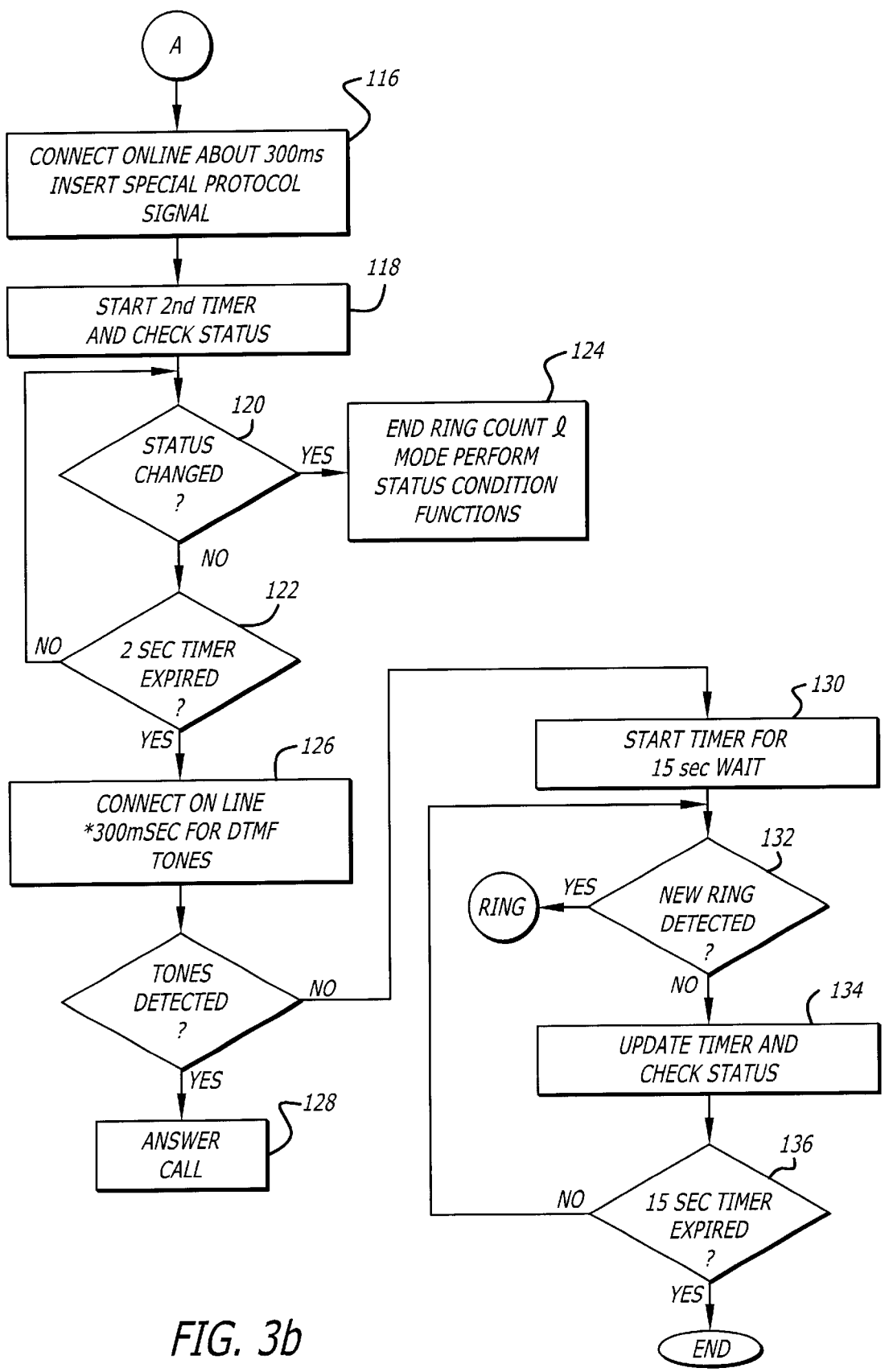

FIGS. 3*a* and 3*b* show a flowchart for the protocol to allow remote activation of the handset. The process starts with a ring count set to zero in block 100. A ring signal is detected in process block 102 which initializes a timer. The ring count is incremented one unit in process block 104 if it is determined that the ring signal has ended in decision block 106.

Decision block 108 determines whether the ring count has reached a predetermined number. If the ring count has reached the number, the handset answers the call in block 109, if not a wait timer is initiated in block 110. Answering the call provides the caller remote access to the handset to enter the monitor or data retrieval modes. Decision block 112 determines whether a subsequent ring tone is detected. If not, decision block 114 determines whether the silent timer set in block 110 is expired. If the silent timer is expired a tone signal(s) is transmitted onto the telephone line from the handset in block 116 and a second timer is set in block 118.

Determinations of a change in status and expiration of the timer are made in decision blocks 120 and 122, respectively. A change in status will jump to block 124 where status condition functions are performed by the process. If the timer has expired then the process proceeds to block 126 where the handset connects to the telephone line to detect a DTMF tone.

If a DTMF tone is detected the call is answered and the handset can enter the monitor or data retrieval modes in block 128, if not the start timer is reset in block 130.

In decision block 132, a determination is made determines whether a new ring signal has been is detected. If no new ring signal has been is detected, the status and timer are updated in block 134, and in decision block 136, a determination is made whether the timer has expired. If no ring signal has been detected and the timer has expired, the process ends.

The controller 30 may have another protocol wherein the handset is activated if a second series of ring signals is generated within a predetermined time interval. This allows handset activation without interference with voice mail. The caller can activate the handset by calling the phone, hanging up, and then call the phone again within the predetermined time interval. The controller 30 activates the handset after detecting the second series of ring signals within the time interval. By way of example the time interval may be 20 seconds. The controller 30 can add the ring count of the subsequent call(s) to reach a ring count that activates the handset.

Instead of remote data access, a user can retrieve the operating instructions by depressing the PRGM button 38. The controller 30 then causes the operating instructions to be emitted from the speaker 18. This mode may include voice assisted instructions and queries wherein the user responds by pushing certain keypads 36. The handset 10 may also generate audible data relating to the phone numbers stored in memory.

The handset thus allows a user to retrieve the operating instructions of the phone without having to refer to a printed manual. Additionally, a caller can place the handset in a data retrieval or monitor mode without interfering with an answering machine or voice mail.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A telephone handset that can be coupled to a telephone line that carries a series of ring signals, and a secondary phone device that has a line voltage detection circuit which detects a voltage drop within a predetermined time interval, comprising:
    a line interface circuit that can be coupled to the telephone line; and,
    a controller coupled to said line interface circuit, said controller causes the generation of a tone signal on the telephone line and is activated if a subsequent activation tone is detected on the telephone line, said controller connects to the telephone line to detect the activation signal for a time interval less than the predetermined time interval of the line voltage detection circuit of the secondary phone device.

2. The handset of claim 1, wherein said controller causes the generation of a pair of tone signals, each having a different frequency, and together having a time interval less than the pre-determined time interval.

3. The handset of claim 1, wherein said controller is activated into a monitoring mode.

4. The handset of claim 1, wherein said controller generates the tone signal after termination of the ring signals.

5. The handset of claim 1, further comprising:
    a memory device that stores operating instructions for operating the handset; and,
    wherein said controller is operatively coupled to said memory device and said line interface circuit to retrieve said operating instructions from said memory device and transmit said operating instructions through said line interface circuit.

6. The handset of claim 1, wherein said controller is activated into a data retrieval mode.

7. A telephone handset that can be coupled to a telephone line that carries a series of ring signals, and a secondary phone device that has a line voltage detection circuit which detects a voltage drop within a predetermined time interval, comprising:
    a line interface circuit that can be coupled to the telephone line; and,
    controller means for causing the generation of a tone signal on the telephone line and is activated if a subsequent activation tone is detected on the telephone line, said controller means connects to the telephone line to detect the activation signal for a time interval less than the predetermined time interval of the line voltage detection circuit.

8. The handset of claim 7, wherein said controller means causes the generation of a pair of tone signals, each having a different frequency, and together having a time interval less than the predetermined time interval.

9. The handset of claim 7, wherein said controller means is activated into a monitoring mode.

10. The handset of claim 7, wherein said controller means generates the tone signal after termination of the ring signals.

11. The handset of claim 7, further comprising:
    memory means for storing operating instructions for operating the handset; and,
    wherein said controller means is operative to retrieve said operating instructions from said memory means and transmit said operating instructions through said line interface circuit.

12. The handset of claim 7, wherein said controller moans is activated into a data retrieval mode.

13. A method for activating a telephone handset, comprising:
    transmitting a ring signal to a telephone handset from a caller unit;
    detecting the ring signal;
    activating a secondary phone device that has a line voltage detection circuit which detects a voltage drop within a predetermined time interval;
    transmitting a tone signal from the telephone handset;
    connecting on line to detect an activation signal for a time interval less than the predetermined time interval of the line voltage detection circuit;
    transmitting an activation signal to the telephone handset from the caller unit; and,
    activating the telephone handset.

14. The method of claim 13, wherein the telephone handset is activated into a monitoring mode.

15. The method of claim 13, wherein the telephone handset is activated into a data retrieval mode.

16. A telephone handset that can be coupled to a telephone line that carries a first series of ring signals followed by a second series of ring signals, and that can be remotely activated without interfering with an associated answering machine or service that answers the handset after a pre-defined number of rings, comprising:
    a line interface circuit that can be coupled to the telephone line; and,
    a controller coupled to said line interface circuit, wherein said controller:
        counts the number of rings in each of the first and second series of ring signals;
        adds the number of rings in the second series of ring signals to the number of rings in the first series of ring signals; and,
        activates the handset when the sum of the number of rings in the first and second series of ring signals equals a predetermined number of rings.

17. The handset of claim 16, wherein said controller is activated into a monitoring mode.

18. A method for remotely retrieving operating instructions from the telephone handset of claim 16, comprising:
    providing a memory device in said handset, said memory device being operatively coupled to said controller;
    storing said operating instructions in said memory device;
    remotely activating said handset;
    requesting said operating instructions of said handset;
    retrieving said operating instructions from said memory device; and,
    transmitting said operating instructions from said handset through said line interface circuit.

19. The handset of claim 16, wherein said controller is activated into a data retrieval mode.

20. The handset of claim 16, wherein said predetermined number of rings is equal to or greater than said predefined number of rings.

21. The handset of claim 16, wherein said controller is activated into a monitoring mode.

22. A method for activating a telephone handset without interfering with an associated answering machine or service that answers the handset after a predefined number of rings, comprising:

transmitting a first series of ring signals to a telephone handset from a caller unit;

transmitting a second series of ring signals to the telephone handset from the caller unit;

counting the number of rings in each of the first and second series of ring signals;

adding the number of rings in the second series of ring signals to the number of rings in the first series of ring signals; and, activating the handset when the sum of the number of rings in the first and second series of ring signals equals a predetermined number of rings.

23. The method of claim 22, wherein the telephone handset is activated into a monitoring mode.

24. The method of claim 22, wherein said predetermined number of rings is equal to or greater than said predefined number of rings.

25. The method of claim 22, wherein the telephone handset is activated into a data retrieval mode.

* * * * *